(12) United States Patent
Li

(10) Patent No.: US 11,048,122 B1
(45) Date of Patent: Jun. 29, 2021

(54) LIQUID CRYSTAL DISPLAY PANEL AND LIQUID CRYSTAL DISPLAY DEVICE

(71) Applicant: TCL CHINA STAR OPTOELECTRONICS TECHNOLOGY CO., LTD., Guangdong (CN)

(72) Inventor: Qian Li, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 2 days.

(21) Appl. No.: 16/627,797

(22) PCT Filed: Dec. 27, 2019

(86) PCT No.: PCT/CN2019/129226
§ 371 (c)(1),
(2) Date: Dec. 31, 2019

(30) Foreign Application Priority Data

Dec. 17, 2019 (CN) .......................... 201911303809.0

(51) Int. Cl.
*G02F 1/13357* (2006.01)
*G02F 1/1335* (2006.01)
*C09D 5/22* (2006.01)
*C09D 7/20* (2018.01)
*C09K 11/06* (2006.01)
(Continued)

(52) U.S. Cl.
CPC ......... *G02F 1/133617* (2013.01); *C09D 5/22* (2013.01); *C09D 7/20* (2018.01); *C09D 129/04* (2013.01); *C09K 11/06* (2013.01); *G02F 1/133528* (2013.01); *C09K 2211/1007* (2013.01); *C09K 2211/1018* (2013.01); *G02F 1/133397* (2021.01)

(58) Field of Classification Search
CPC ......... G02F 1/133617; G02F 1/133528; G02F 1/133397; C09D 129/04; C09D 7/20; G09D 5/22; C09K 11/06; C09K 2211/1007; C09K 2211/1018
USPC .......................................................... 349/71
See application file for complete search history.

(56) References Cited

U.S. PATENT DOCUMENTS

2010/0141859 A1\* 6/2010 Park .................. C09K 19/02
349/39
2011/0051057 A1\* 3/2011 Song .................. G02F 1/1393
349/106
(Continued)

FOREIGN PATENT DOCUMENTS

CN 106536575 A 3/2017
CN 109917587 A 6/2019
(Continued)

*Primary Examiner* — Nathanael R Briggs
*Assistant Examiner* — William D Peterson
(74) *Attorney, Agent, or Firm* — Mark M. Friedman

(57) ABSTRACT

A liquid crystal display panel and a liquid crystal display device are provided. The liquid crystal display panel comprises a liquid crystal layer containing reactive monomers, a backlight layer disposed on a side of the liquid crystal layer and used to emit backlight to the liquid crystal layer, and a light conversion film layer disposed between the backlight layer and the liquid crystal layer and used to absorb ultraviolet light in the backlight. The present disclosure can improve the display quality of liquid crystal display panels by the above method.

12 Claims, 4 Drawing Sheets

(51) Int. Cl.
*C09D 129/04* (2006.01)
*G02F 1/1333* (2006.01)

(56) References Cited

U.S. PATENT DOCUMENTS

| | | | | |
|---|---|---|---|---|
| 2013/0148057 A1* | 6/2013 | Kang | ....................... | C08K 9/08 349/64 |
| 2017/0121441 A1 | 5/2017 | Tamura et al. | | |

FOREIGN PATENT DOCUMENTS

| | | | |
|---|---|---|---|
| JP | 57212285 A | * | 12/1982 |
| JP | H11125808 A | | 5/1995 |
| WO | 2018088386 A1 | | 5/2018 |

* cited by examiner

LIQUID CRYSTAL DISPLAY PANEL AND LIQUID CRYSTAL DISPLAY DEVICE

FIELD OF INVENTION

The present disclosure relates to the field of display technologies, and more particularly, to a liquid crystal display panel and a liquid crystal display device.

BACKGROUND OF INVENTION

A liquid crystal display device is composed of a liquid crystal panel and a backlight module which provides a light source. Liquid crystals contain reactive monomers (RMs) which are subjected to a polymerization reaction under ultraviolet light (UV), and there are still a few reactive monomer residues after high-quality vertical alignment (HVA) process.

Technical problem: in the reliability verification process of liquid crystal panels, that is, the lighting process, light emitted from a backboard containing UV light, which would make remaining RM residues in the liquid crystals continue to be subjected to a polymerization reaction, then change a pretilt angle of the liquid crystals, and produce an afterimage.

SUMMARY OF INVENTION

The present disclosure provides a liquid crystal display panel and a liquid crystal display device to improve the display quality of liquid crystal display panels.

To solve the above technical problem, a technical solution provided by the present disclosure is to provide a liquid crystal display panel which comprises a liquid crystal layer containing reactive monomers; a backlight layer disposed on a side of the liquid crystal layer and used to emit backlight to the liquid crystal layer; and a light conversion film layer disposed between the backlight layer and the liquid crystal layer and used to absorb ultraviolet light in the backlight.

To solve the above technical problem, another technical solution provided by the present disclosure is to provide a liquid crystal display device which comprises the above liquid crystal display panel.

Beneficial effect: the beneficial effect of the present disclosure is: compared to current technology, the present disclosure disposes a light conversion film layer between a backlight layer and a liquid crystal layer to absorb ultraviolet light in the backlight emitted from the backlight layer, which makes reactive monomers in the liquid crystal layer not be subjected to a reaction, thereby making a pretilt angle of liquid crystals in the liquid crystal layer not changed, and improving the display quality of liquid crystal display panels.

DESCRIPTION OF DRAWINGS

The accompanying figures to be used in the description of embodiments of the present disclosure or prior art will be described in brief to more clearly illustrate the technical solutions of the embodiments or the prior art. The accompanying figures described below are only part of the embodiments of the present disclosure, from which those skilled in the art can derive further figures without making any inventive efforts.

DETAILED DESCRIPTION OF PREFERRED EMBODIMENTS

The embodiments of the present disclosure are described in detail hereinafter. Examples of the described embodiments are given in the accompanying drawings. The specific embodiments described with reference to the attached drawings are all exemplary and are intended to illustrate and interpret the present disclosure. Based on the embodiments in the present disclosure, all other embodiments obtained by those skilled in the art without creative efforts are within the scope of the present disclosure.

Figure 1:
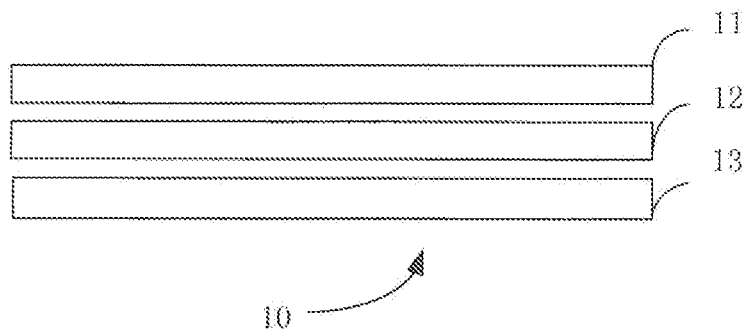
FIG. 1 is a schematic structural diagram of a liquid crystal display panel according to a first embodiment of the present disclosure.

Referring to FIG. 1, FIG. 1 is a schematic structural diagram of a liquid crystal display panel according to a first embodiment of the present disclosure. A liquid crystal display panel 10 includes a liquid crystal layer 11, a backlight layer 12, and a light conversion film layer 13. The liquid crystal layer 11 has been processed by HVA, and a few reactive monomers 111 are still retained in the liquid crystal layer 11. The reactive monomers 111 can be cured under ultraviolet light, and after the HVA process, if the remaining reactive monomers 111 in the liquid crystal layer 11 are subjected to a curing reaction, the predetermined pretilt angle in the HVA process would be affected, thereby making the liquid crystal display panel 10 have an afterimage when displaying.

The backlight layer 12 is used to provide backlight to the liquid crystal layer 11. In general, the backlight is white light, but the backlight comprises ultraviolet light which is invisible to the naked eye. If the ultraviolet light is emitted to the liquid crystal layer 11 with the white light, it will cause the reactive monomers 111 in the liquid crystal layer 11 to cure.

The light conversion film layer 13 is disposed between the backlight layer 12 and the liquid crystal layer 11, and is used to absorb the ultraviolet light in the backlight which is emitted from the backlight layer 12. Therefore, the ultraviolet light in the backlight cannot be emitted to the reactive monomers 111. Moreover, visible light in the backlight cannot be absorbed by the light conversion film layer 13, and still can be emitted to the liquid crystal layer 12.

In the embodiment, the light conversion film layer 13 can convert ultraviolet light into other light, or directly absorb the ultraviolet light.

From the above description, the embodiment disposes the light conversion film layer between the backlight layer and the liquid crystal layer to absorb ultraviolet light in the backlight emitted from the backlight layer, which makes the reactive monomers in the liquid crystal layer not be subjected to a reaction, thereby making the pretilt angle of the liquid crystals in the liquid crystal layer not changed, and improving the display quality of the liquid crystal display panel.

Figure 2:
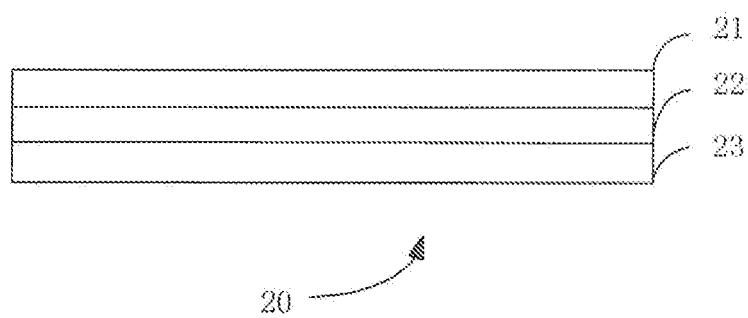
FIG. 2 is a schematic structural diagram of a liquid crystal display panel according to a second embodiment of the present disclosure.

Referring to FIG. 2, FIG. 2 is a schematic structural diagram of a liquid crystal display panel according to a second embodiment of the present disclosure. A liquid crystal display panel 20 includes a liquid crystal layer 21, a backlight layer 22, and a light conversion film layer 23. Wherein, the structure, positional relationship, and use of the liquid crystal layer 21 and the backlight layer 22 are basically consistent with the liquid crystal layer 11 and the backlight layer 12 of the liquid crystal display panel according to the first embodiment of the present disclosure, and are not repeated herein.

In the embodiment, the light conversion film layer 23 is disposed on a surface of the backlight layer 22 adjacent to the liquid crystal layer 21. Ultraviolet light in the backlight emitted from the backlight layer 22 would be absorbed or converted into other light by the light conversion film layer 23 once emitted, and would not be emitted to the reactive monomers in the liquid crystal layer 21, thereby preventing displayed afterimage.

From the above description, the embodiment disposes the light conversion film layer on a surface of the backlight layer adjacent to the liquid crystal layer to absorb ultraviolet light in the backlight when the backlight is emitted, which prevents the reactive monomers in the liquid crystal layer to be subjected to a reaction, thereby making the pretilt angle of the liquid crystals in the liquid crystal layer not changed, and improving the display quality of the liquid crystal display panel.

Figure 3:
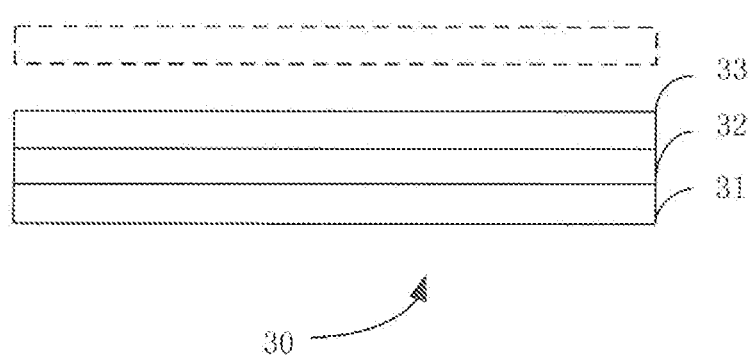
FIG. 3 is a schematic structural diagram of a backlight layer according to an embodiment of the present disclosure.

Referring to FIG. 3, FIG. 3 is a schematic structural diagram of a backlight layer according to an embodiment of the present disclosure. A backlight layer 30 includes a light source layer 31, an upper diffusion layer 32, and a light conversion film layer 33. The upper diffusion layer 32 is disposed on a side of the backlight layer 30 adjacent to the liquid crystal layer; and the light conversion film layer 33 is disposed on a side of the upper diffusion layer 32 adjacent to the liquid crystal layer.

The light source layer 31 is used to provide a light source for the backlight layer 30, the upper diffusion layer 32 is used to diffuse light emitted from the light source layer 31, and the light conversion film layer 33 is used to absorb or convert ultraviolet light in the light diffused from the upper diffusion layer 32.

In the embodiment, the light conversion film layer 33 is formed by adding a light conversion material to a solution including formaldehyde and polyvinyl alcohol to obtain a light conversion solution, then coating the light conversion solution on a surface of the upper diffusion layer 32, and drying.

From the above description, the embodiment of the present disclosure can effectively reduce a thickness of the light conversion film layer and then reduce a thickness of the entire liquid crystal display panel by adding a light conversion material to a solution including formaldehyde and polyvinyl alcohol to obtain a light conversion solution, then coating the light conversion solution on a surface of the upper diffusion layer, and drying to from the light conversion film layer.

Figure 4:
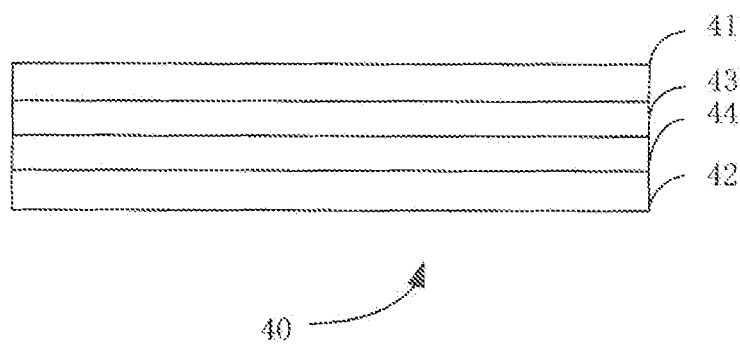
FIG. 4 is a schematic structural diagram of a liquid crystal display panel according to a third embodiment of the present disclosure.

Referring to FIG. 4, FIG. 4 is a schematic structural diagram of a liquid crystal display panel according to a third embodiment of the present disclosure. A liquid crystal display panel 40 includes a liquid crystal layer 41, a backlight layer 42, a polarizing layer 43, and a light conversion film layer 44. Wherein, the structure, positional relationship, and use of the liquid crystal layer 41 and the backlight layer 42 are basically consistent with the liquid crystal layer 11 and the backlight layer 12 of the liquid crystal display panel according to the first embodiment of the present disclosure, and are not repeated herein.

The polarizing layer 43 is disposed between the backlight layer 42 and the liquid crystal layer 41, and is used to control a polarization direction of light emitted from the backlight layer 42 to the liquid crystals 41. The light conversion film layer 44 is disposed on a side of the polarizing layer 43 adjacent to the backlight layer 42. Ultraviolet light in the backlight emitted from the backlight layer 42 would be absorbed or converted into other light by the light conversion film layer 44 once emitted to the polarizing layer 43, and would not be emitted to reactive monomers in the liquid crystal layer 41, thereby preventing displayed afterimage.

From the above description, the embodiment disposes the light conversion film layer on a surface of the polarizing layer adjacent to the backlight layer to absorb ultraviolet light in the backlight, which prevents the reactive monomers in the liquid crystal layer to be subjected to a reaction, thereby making the pretilt angle of the liquid crystals in the liquid crystal layer not changed, and improving the display quality of the liquid crystal display panel.

Figure 5:
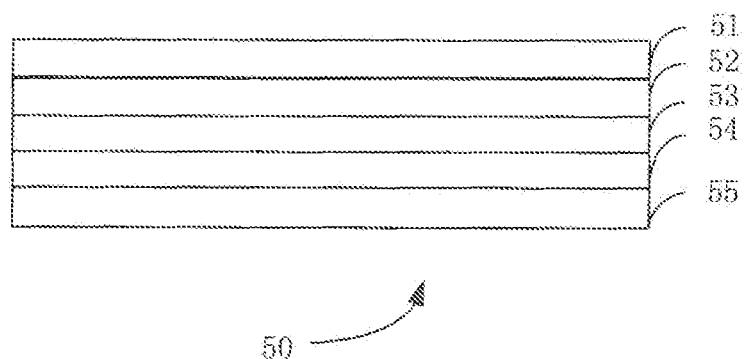
FIG. 5 is a schematic structural diagram of a polarizing layer according to an embodiment of the present disclosure.

Referring to FIG. 5, FIG. 5 is a schematic structural diagram of a polarizing layer according to an embodiment of the present disclosure. A polarizing layer 50 includes a surface protective layer 51, a first cellulose triacetate film layer 52, a polyvinyl alcohol film layer 53, a second cellulose triacetate film layer 54, an adhesive layer 55, a light conversion film layer 56, and a peelable protective film layer 57.

The surface protective layer 51 is disposed on a side of the polarizing layer 50 adjacent to the liquid crystal layer, the first cellulose triacetate film layer 52 is disposed on a side of the surface protective layer 51 adjacent to the backlight layer, the polyvinyl alcohol film layer 53 is disposed on a side of the first cellulose triacetate film layer 52 adjacent to the backlight layer, the second cellulose triacetate film layer 54 is disposed on a side of the polyvinyl alcohol film layer 53 adjacent to the backlight layer, the adhesive layer 55 is disposed on a side of the second cellulose triacetate film layer 54 adjacent to the backlight layer, the peelable protective film layer 57 is disposed on a side of the adhesive layer adjacent to the backlight layer, and the light conversion film layer 56 is disposed between the adhesive layer 55 and the peelable protective film layer 57.

In the embodiment, the light conversion film layer 56 is formed by adding a light conversion material to a solution including formaldehyde and polyvinyl alcohol to obtain a light conversion solution, then coating the light conversion solution on a surface of the adhesive layer 55, and drying.

From the above description, the embodiment of the present disclosure can effectively reduce a thickness of the light conversion film layer and then reduce a thickness of the entire liquid crystal display panel by adding a light conversion material to a solution including formaldehyde and polyvinyl alcohol to obtain a light conversion solution, then coating the light conversion solution on a surface of the adhesive layer, and drying to from the light conversion film layer.

Figure 6:
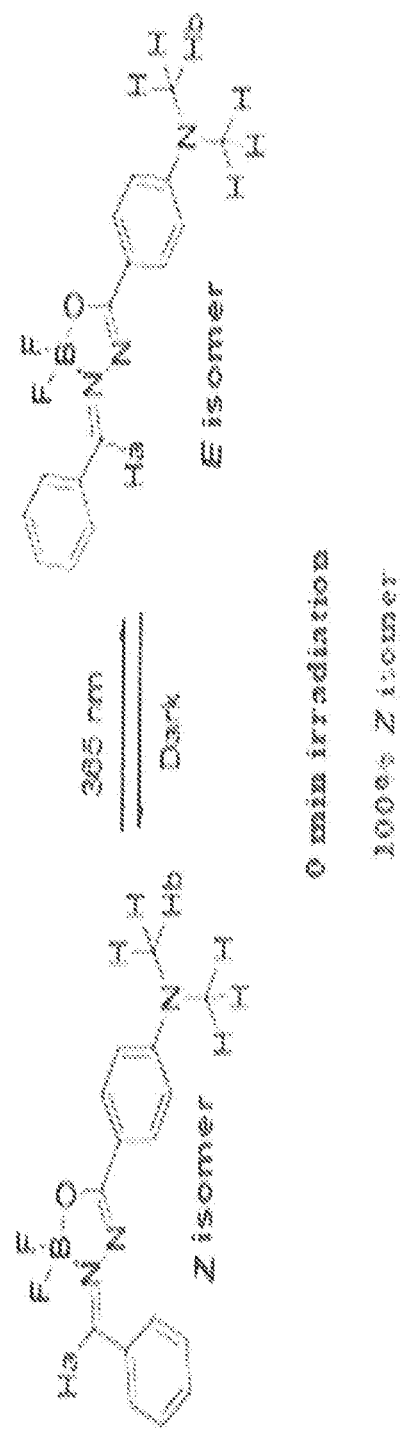
FIG. 6 is a schematic structural diagram of a light conversion material according to an embodiment of the present disclosure.

Referring to FIG. 6, FIG. 6 is a schematic structural diagram of a light conversion material according to an embodiment of the present disclosure. As shown in FIG. 6, the light conversion material in the embodiment is difluoroboronate anchored acylhydrozones (BOAHY). The material is subjected to cis-trans isomerization under UV light and the dark. That is, the light conversion material can absorb ultraviolet light and convert it into other color light under UV light, and has reversibility in the dark, so the light conversion material has continuous application without causing failure to absorb ultraviolet light.

From the above description, the embodiment uses BOAHY as the light conversion material, so the light conversion material has reversibility in the dark environment and has continuous application without causing failure to absorb ultraviolet light.

Figure 7:
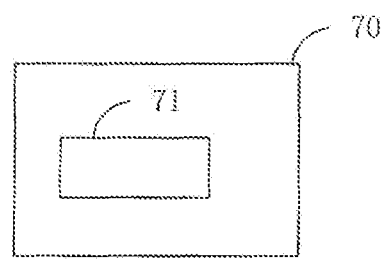
FIG. 7 is a schematic structural diagram of a liquid crystal display device according to an embodiment of the present disclosure.

Referring to FIG. 7, FIG. 7 is a schematic structural diagram of a liquid crystal display device according to an embodiment of the present disclosure. A liquid crystal display device 70 includes a liquid crystal display panel 71, and the liquid crystal display panel 71 is the liquid crystal display panel shown in FIG. 1 to FIG. 6.

From the above description, the embodiment disposes the light conversion film layer between the backlight layer and the liquid crystal layer of the liquid crystal display panel to absorb ultraviolet light in the backlight emitted from the backlight layer, which makes the reactive monomers in the liquid crystal layer not be subjected to a reaction, thereby making the pretilt angle of the liquid crystals in the liquid crystal layer not changed, and improving the display quality of the liquid crystal display panel.

Different from current technology, the present disclosure disposes the light conversion film layer between the backlight layer and the liquid crystal layer to absorb ultraviolet light in the backlight emitted from the backlight layer, which makes the reactive monomers in the liquid crystal layer not be subjected to a reaction, thereby making the pretilt angle of the liquid crystals in the liquid crystal layer not changed, and improving the display quality of the liquid crystal display panel.

The present disclosure has been described with a preferred embodiment thereof. The preferred embodiment is not intended to limit the present disclosure, and it is understood that many changes and modifications to the described embodiment can be carried out without departing from the scope and the spirit of the disclosure.

What is claimed is:

1. A liquid crystal display panel, comprising:
   a liquid crystal layer containing reactive monomers;
   a backlight layer disposed on a side of the liquid crystal layer and configured to emit backlight to the liquid crystal layer; and
   a light conversion film layer disposed between the backlight layer and the liquid crystal layer and configured to absorb ultraviolet light in the backlight;
   wherein the light conversion film layer comprises a light conversion material, and the light conversion material comprises difluoroboronate anchored acylhydrozones (BOAHY).

2. The liquid crystal display panel according to claim 1, wherein the light conversion film layer is disposed on a surface of the backlight layer adjacent to the liquid crystal layer.

3. The liquid crystal display panel according to claim 2, wherein the backlight layer comprises an upper diffusion layer disposed on a side of the backlight layer adjacent to the liquid crystal layer; and
   the light conversion film layer is disposed on a side of the upper diffusion layer adjacent to the liquid crystal layer.

4. The liquid crystal display panel according to claim 3, wherein the light conversion film layer is formed by adding the light conversion material to a solution including formaldehyde and polyvinyl alcohol to obtain a light conversion solution, then coating the light conversion solution on a surface of the upper diffusion layer, and drying.

5. The liquid crystal display panel according to claim 4, wherein the light conversion material is subjected to an isomerization reaction under ultraviolet light to convert the ultraviolet light into other light.

6. The liquid crystal display panel according to claim 5, wherein the light conversion material is subjected to an anti-isomerization reaction in dark.

7. The liquid crystal display panel according to claim 3, further comprising:
   a polarizing layer disposed between the backlight layer and the liquid crystal layer;
   wherein the light conversion film layer is disposed on a side of the polarizing layer adjacent to the backlight layer.

8. The liquid crystal display panel according to claim 7, wherein the polarizing layer comprises:
   a surface protective layer disposed on a side of the polarizing layer adjacent to the liquid crystal layer;
   a first cellulose triacetate film layer disposed on a side of the surface protective layer adjacent to the backlight layer;
   a polyvinyl alcohol film layer disposed on a side of the first cellulose triacetate film layer adjacent to the backlight layer;
   a second cellulose triacetate film layer disposed on a side of the polyvinyl alcohol film layer adjacent to the backlight layer;
   an adhesive layer disposed on a side of the second cellulose triacetate film layer adjacent to the backlight layer; and
   a peelable protective film layer disposed on a side of the adhesive layer adjacent to the backlight layer;
   wherein the light conversion film layer is disposed between the adhesive layer and the peelable protective film layer.

9. The liquid crystal display panel according to claim 8, wherein the light conversion film layer is formed by adding the light conversion material to a solution including formaldehyde and polyvinyl alcohol to obtain a light conversion solution, then coating the light conversion solution on a surface of the upper diffusion layer, and drying.

10. The liquid crystal display panel according to claim 9, wherein the light conversion material is subjected to an isomerization reaction under ultraviolet light to convert the ultraviolet light into other light.

11. The liquid crystal display panel according to claim 10, wherein the light conversion material is subjected to an anti-isomerization reaction in dark.

12. A liquid crystal display device, comprising the liquid crystal display panel according to claim 1.

* * * * *